United States Patent Office 3,749,731
Patented July 31, 1973

3,749,731
2-OXO-N-(2-THIAZOLYL)-3-INDOLINE-CARBOXAMIDE
Harold Zinnes, Rockaway, Martin L. Schwartz, Gillette, and John Shavel, Jr., Mendham, N.J., assignors to Warner-Lambert Company, Morris Plains, N.J.
No Drawing. Filed July 8, 1971, Ser. No. 160,904
Int. Cl. C07d 99/10
U.S. Cl. 260—306.8 R    1 Claim

ABSTRACT OF THE DISCLOSURE 2-oxo-N-(2-thiazolyl)-3-indolinecarboxamides having the following structural formula are discussed:

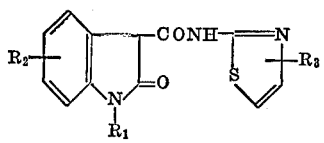

(I)

wherein $R_1$ is hydrogen, alkyl, aryl, or aralkyl; $R_2$ is hydrogen, alkyl, aralkyl, aryl, halogen, alkoxy, cyano, carbualkoxy, nitro, trifluoromethyl, and the like; $R_3$ is hydrogen or alkyl.

They are prepared in accordance with the following reaction schemes:

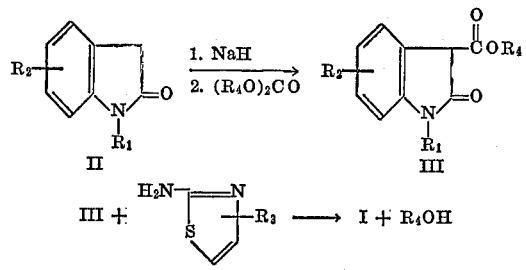

These compounds are useful as antipyretic, analgesic, and anti-inflammatory agents.

---

The present invention relates to 2-oxo-N-(2-thiazolyl)-3-indolinecarboxamides having the following structural formula:

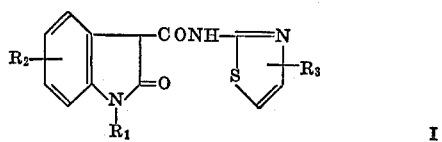

I wherein $R_1$ is hydrogen, alkyl, aryl, or aralkyl; $R_2$ is hydrogen, alkyl, aralkyl, aryl, halogen, alkoxy, cyano, carbualkoxy, nitro, trifluoromethyl, and the like; $R_3$ is hydrogen or alkyl.

In the above definitions for $R_1$, $R_2$ and $R_3$, the term "alkyl" and the alkyl portion of "alkoxy" include aliphatic hydrocarbons having 1 to 7 carbon atoms in the carbon chains. They include straight chain as well as branched chain carbon radicals, for example, methyl, ethyl, propyl, isopropyl and the like. The term "aryl" as used herein denotes a monocyclic, aromatic hydrocarbon radical preferably of 6 to 10 carbon atoms such as, for example, phenyl, tolyl and the like. The term "aralkyl" means an alkyl group in which aryl as defined above is substituted for hydrogen such as for example, benzyl phenethyl and the like.

The compounds of Formula I are useful as antiinflammatory agents, antipyretics, and analgesics in mammals such as cats, dogs, monkeys and the like. When administered orally or intraperitoneally to rats at a dose of 10–200 mg./kg., they are able to cause reduction in swelling of the paw induced by injection into the foot pads of an irritant such as carrageenin. Oral doses of 25–100 mg./kg. are sufficient to inhibit yeast induced hyperthermia in the rat. Oral doses of 25–200 mg./kg. have a significant analgesic effect as determined by the phenylquinone writhing procedure in mice.

In order to use these compounds, they are formulated with standard pharmaceutical diluents such as lactose, mannitol and the like, into dosage forms such as tablets by methods known to the pharmacists' art. They are also formulated into injectable dosage forms by combining them with diluents such as water for injection, peanut oil, sesame oil and the like. In these dosage forms the active ingredient is present from about 10–250 mg. per dosage unit.

The dose requirement to treat, for example, inflammation or pain caused by arthritis is within the above described range. Such a requirement can be varied depending upon the sex, age, weight and species of the mammal being treated by methods well known to the healing arts.

In accordance with the present invention, the above compounds are prepared as represented by the following reaction scheme:

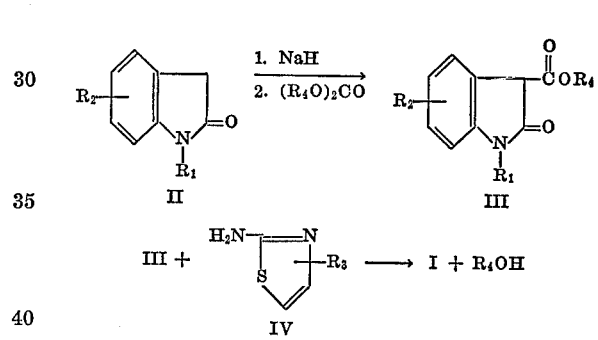

Referring to the above scheme, an oxindole of Formula II is converted to its anion by treatment with a base such as sodium hydride. This anion is refluxed with a dialkyl carbonate in a solvent such as tetrahydrofuran to give an ester of Formula III where $R_4$ is alkyl. In the case where the starting material is a compound of Formula II, wherein $R_1$ is hydrogen, the use of excess base, excess dimethyl carbonate, and prolonged reflux time results in N-methylation as well as α-carbomethoxylation so that compounds of Formula IV are prepared wherein $R_1$ and $R_4$ are methyl. Refluxing the ester of Formula III with a 2-aminothiazole of Formula IV in a solvent such as toluene, results in the formation of compounds of Formula I which are the compounds of this invention. The last step is best carried out in a Soxhlet apparatus, the thimble of which contains Linde type 4A molecular sieves which aid in the removal of the alcohol from the reaction mixture.

The strating oxindoles (II) are either commercially available or are prepared by methods described in the literature, i.e., R. Stolle, et al., Ger. 335, 673, CA 17, 1802.
R. Stolle, et al., J. Prakt. Chem., 128, 1 (1930) CA 25, 203 (1931).
A. H. Beckett, et al., Tetrahedron, 24, 6093 (1968).
J. W. Cook, et al., J. Chem. Soc. 3904 (1952).
J. C. Porter, et al., J. Chem. Soc., 620 (1941).
R. H. Eastman, J.A.C.S., 73, 4514 (1951).

In order to illustrate the practice of this invention, the following examples are included:

EXAMPLE 1

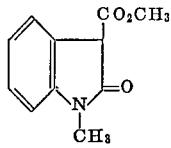

Methyl 1-methyl-2-oxo-3-indolinecarboxylate (A) From N-methyloxindole: To a slurry of 0.3 mole of sodium hydride in 250 ml. of tetrahydrofuran at −20° was added a solution of 35.8 g. (0.25 mole) of N-methyloxindole in 500 ml. of tetrahydrofuran. The resulting anion was treated with a solution 225 g. (2.5 moles) of dimethyl carbonate in 750 ml. of tetrahydrofuran, the mixture was refluxed with stirring for 68 hours, and the solvent was removed. The residue was stirred with a mixture of 200 ml. of 1 N sodium hydroxide and 1700 ml. of water and the mixture was filtered. The filtrate was acidified with 10% hydrochloric acid and the resulting precipitate was collected and dissolved in dichloromethane. The solution was washed well with water, dried, and evaporated. Recrystallization of the solid residue (86 g., M.P. 124–132°) from methanol gave 70.5 g. of crystalline product, M.P. 131–135°. Further recrystallization gave an analytical sample, M.P. 135–137°.

Analysis.—Calcd. for $C_{11}H_{11}NO_3$ (percent): C, 64.38; H, 5.40; N, 6.83. Found (percent): C, 64.46; H, 5.46; N, 6.66.

(B) From oxindole: The reaction was carried out under the same conditions as in procedure A, above, using 0.25 mole of sodium hydride, 8.0 g. (0.06 mole) of oxindole, and 54 g. (0.6 mole) of dimethyl carbonate. The yield of crude product, M.P. 122–130° was 7.3 g. Recrystallization from methanol gave 2.2 g. of product, M.P. 131–135°, identified by comparison of its spectral properties with those of the product of procedure A.

EXAMPLE 2

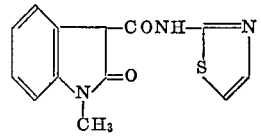

1-methyl-2-oxo-N-(2-thiazolyl)-3-indolinecarboxamide

A mixture of 10.2 g. (0.05 mole) of methyl 1-methyl-2-oxo-3-indolinecarboxylate, 5.5 g. (0.055 mole) of 2-aminothiazole, and 500 ml. of toluene was refluxed for 24 hours in a Soxhlet apparatus, the thimble of which contained 15 g. of Linde type 4A molecular sieve. The solvent was removed and the residue solidified by trituration with ether. Recrystallization from acetonitrile gave 4.8 g. of crystalline product, M.P. 198–201°.

Analysis.—Calcd. for $C_{13}H_{11}N_3O_2S$ (percent): C, 57.13; H, 4.06; N, 15.37; S, 11.73. Found (percent): C, 57.13; H, 4.00; N, 15.58; S, 12.00.

We claim:
1. 2-oxo-N-(2-thiazolyl)-3-indolinecarboxamide.

References Cited
UNITED STATES PATENTS 3,646,053    2/1972    Poletto et al. ____ 260—306.8 R ALEX MAZEL, Primary Examiner R. J. GALLAGHER, Assistant Examiner U.S. Cl. X.R.

260—325; 424—270